United States Patent
Pasold

[11] 3,756,691
[45] Sept. 4, 1973

[54] APERTURE ABERRATION REDUCING DEVICE

[75] Inventor: Gunter Pasold, Dresden, Germany

[73] Assignee: Veb Kombinat Robotron, Radeberg, Germany

[22] Filed: Sept. 20, 1971

[21] Appl. No.: 181,684

Related U.S. Application Data

[63] Continuation-in-part of Ser. No. 22,202, March 24, 1970, Pat. No. 3,644,018.

[52] U.S. Cl.............. 350/157, 350/DIG. 2, 350/147, 350/175 DR
[51] Int. Cl.............................................G02b 5/30
[58] Field of Search................... 350/147, 150, 157, 350/175 DR, DIG. 2

[56] References Cited
UNITED STATES PATENTS

| | | | |
|---|---|---|---|
| 3,391,972 | 7/1968 | Harris et al. | 350/DIG. 2 |
| 3,529,885 | 9/1970 | Ammann | 350/157 |
| 3,575,488 | 4/1971 | Ohm et al. | 350/150 |
| 3,497,831 | 2/1970 | Hickey et al. | 350/150 |

OTHER PUBLICATIONS

Amman, "Modification of Devices . . . Operating Between . . Polarizers . . ." J. Opt. Soc. Am. Vol. 55, No. 4 (April 1965) pp. 412–417.
Habegger, "Astigmatic Aberration Correction" IBM Tech. Discl. Bull. Vol. 11, No. 12 (May, 1969) p. 1776.

*Primary Examiner*—David Schonberg
*Assistant Examiner*—Michael J. Tokar
*Attorney*—Nolte & Nolte

[57] ABSTRACT

The invention reduces aperture aberrations, for example in digital light deflecting systems by means of two identical crystal systems each of which comprises at least one double refractive crystals. An element for rotating the polarization plane of the partial beams of rays is located between the two crystal systems.

15 Claims, 7 Drawing Figures

INVENTOR
GÜNTER PASOLD
BY Nolte & Nolte
ATTORNEYS

APERTURE ABERRATION REDUCING DEVICE

This application is a continuation-in-part of application Ser. No. 22,202, filed Mar. 24, 1970 now U.S. Pat. No. 3,644,018.

The present invention relates to a device comprising systems of double refractive crystals for reducing the aperture aberration, for example for use in digital light deflection systems.

Double refractive crystals generally split a bunch or beam of light rays into an ordinary partial beam of light rays and an extraordinary beam of light rays. Due to image aberrations the image of each partial beam of rays is not an image point or image element but rather an image speck. Such image aberrations are the result of defraction of the beams of light rays or rather of the partial beams of light rays. These aberrations are further due to the distance difference between the ordinary and the extraordinary partial beam of light rays as well as due to the aperture aberration. Such aberration produces the result that the focusing points of the paraxial rays for each partial ray beam and for different planes of incidence do not coincide. The largest distance difference or deviation occurs between the focusing point for the plane of incidence which coincides with the main section of a double refractive crystal and the focusing point for the plane of incidence which extends perpendicularly to said main section.

In order to arrive at a situation wherein the image spots produced for each divided light ray bundle are kept as small as possible, all of the image defects of the doubly refracting crystals must be reduced as low as possible. The image defects arise from the bending of the light rays, or, light ray bundles, from the difference in path length distance between the ordinary and the extraordinary divided light ray bundles and the apertural defects of the doubly refracting crystals. An apertural defect can produce a picture or image spot of the same size as that due to the bending, i.e., difference in path length.

The basic or essential cause of the aforesaid is to be attributed to the finding that for the extraordinary divided light ray bundle, the focus points of the paraxial rays for different incident planes do not converge. The greatest abberation exists between the focus point of the paraxial rays for the incident plane which converges with the principal section of the doubly refracting crystals and the focus point for the incident plane which is perpendicular to the principal section.

A correction of the bending or deviation is not possible. A correction of the path length differences can be carried out by numerous known proposals. For example, for a doubly refracting crystal which is formed as a planoparallel plate, the correction is obtained by adding to such a crystal having either a positive or negative double refraction an additional similar crystal which is characterized by the opposite sign, i.e., negative or positive double refraction. The path length differences have in both of the crystals a different sign (positive or negative). By appropriate selection of the thickness of the second crystal, the path length difference can be made equal to zero.

In accordance with a further known possibility of correction of the path length difference, there is added to a doubly refracting crystal which is formed as a plano-parallel plate, a further crystal which, however, is rotated by 90° from the optical axis of the first crystal. Each divided ray bundle then passes through one of the crystals as an ordinary divided ray bundle and through the other crystal as an extraordinary divided ray bundle. The total optical path length is therefore the same or equal for both of the divided ray bundles.

Special difficulties are encountered for the correction of apertural defects of doubly refracting crystals because the defect arises only in connection with the extraordinary divided ray bundle and apart from this depends on the azimuth angle of the incident plane. Firstly, in the use of doubly refracting crystal systems in which through multiple ray divisions many divided ray bundles are developed, the aperture defect is different for each divided ray bundle and, therefore, must be corrected individually by means of isotropic non-rotationally symmetrical lenses. On this basis, without resorting to a high expenditure, the required correction of the apertural defect cannot be carried out.

The object of the instant invention is to provide means for reducing the size of the image spot of extraordinary divided ray bundles due to the aperture defects of doubly refracting crystals with the smallest expense possible.

It is another object of the invention to reduce the size of the image spots of extraordinary divided ray bundles due to the apertural defects of doubly refracting crystals by means which are not tedious and difficult to install and operate.

It is still another object of the invention to superpose for the extraordinary divided ray bundles, the focus point of the paraxial rays for the incident plane which coincides with the principal section of the doubly refracting crystals with the focus point of the incident plane which is perpendicular to the principal section.

These and other objects and advantages will become apparent from the consideration of the following disclosure.

According to one embodiment of the invention, the problem of apertural defects is solved by adding to any one double refracting crystal an additional completely identical crystal which, however, is rotated by 90° with respect to the axis of the system and by including between the aforesaid two crystals an element which is capable of rotating the polarization plane of the divided ray bundle.

The term "system axis" as used herein is intended to designate the optical axis of the crystal arrangement.

It has been found advantageous to replace each of the two crystals by an identical system of doubly refracting crystals in which in each of the systems the path length difference between the ordinary and the extraordinary divided ray bundles has been corrected as then the total image defect can be kept smaller than if individual crystals are used.

Both in the use of individual crystals and of systems it is advantageous to construct the doubly refracting crystals as planoparallel plates as this permits a particularly simple crystal arrangement.

The reduction of the aperture aberration in the above device employing individual crystals is accomplished in the following manner. Each plane of incidence of a beam of light rays or rather of a partial beam of rays which coincides in any one of the double refractive crystals of one of the systems of this device with its respective mean section extends perpendicularly to the main section of the corresponding double defractive crystal of the second system and vice versa. As a result, the space difference between the focusing point of the paraxial rays for one plane of incidence which coincides with the main section of one double refractive crystal, and the focusing point for a plane of incidence extending perpendicularly to such main section, has an exactly opposite sense in one system as compared to the other system. The resulting spacing or positional difference between the two focusing points thus becomes zero and the aperture aberration of the device is reduced to a minimum.

The arrangement in accordance with the invention formed of two crystals or systems, has as compared to a single crystal or system, changed optical properties, such as, for instance, a change in the distances or of the angles between the divided ray bundles. If such a change is not desirable, a correction of the respective geometric measurements of the doubly refracting crystals can be carried out to thereby restore the original properties without disturbingly influencing or otherwise adversely affecting the required reduction of aperture defects. For example, if the double refracting crystals of the arrangement according to the invention are constructed as planoparallel plates then there results a $\sqrt{2}$ fold light deviation.

If the thickness of all of the double refracting crystals are reduced to 1 $\sqrt{2}$ then the same amount or change in light deviation is brought about as would be caused by a single crystal or system or unreduced crystal thickness.

The rotation of the polarization plane of the divided ray bundles by 90° is required in accordance with the invention can be achieved in a simple manner by means of a $\lambda/2$ thin plate.

The above arrangements in accordance with the invention as above set out have the effect that the extent or degree of the image spot caused by the aperture defect of the doubly refracting crystals or systems is reduced to a minimum. This reduction can amount to more than one order of magnitude. Any remaining apertural defect is then in the order of magnitude of the respective isotropic materials.

The substantial reduction of the size of the image spot of each of the divided ray bundles makes it possible to concentrate the image spots, i.e., to cause them to become more densely positioned (form a clearly defined point) then would be possible in an uncorrected double refracting crystal, or system. If the arrangement in accordance with the invention is used in a digital light deflecting system for the control of optical data storage or retention then the total number of divided ray bundles can be increased while the storage surface remains the same thereby increasing the total capacity of the device.

In the above described device employing crystal systems is seen in that due to the rotation of the additional crystal system by 90°, the resulting light deflection of this rotated system takes place perpendicularly to the light deflection of the other system whereby the total light deflection of the device as compared to that of the individual crystal systems increases only by a factor of $\sqrt{2}$ while the total length is doubled. Assuming, that the device with two crystal systems shall have the same total light deflection as an uncorrected single system, then the just mentioned drawback means that the total length of the device and the requirement for double refractive crystals increases by a factor of $\sqrt{2}$ as compared to the single or individual system. For example, the increase in the total length of the device is disadvantageous with regard to the obtainable storage capacity where the device is used in digital light deflection systems for scanning optical data storage means. Stated differently, such increase in length decreases the possible storage capacity in connection with optical data storage devices. Besides, the increased material requirement of double refractive systems is undesirable.

A further embodiment of the invention is based on recognition of the fact that the elimination or at least reduction of the above outlined drawbacks is not possible if the light deflection of all individual crystals of the system to be corrected takes place in the same direction.

According to a further embodiment of the invention a random first system of double refractive crystals is provided which comprises at least one crystal having a light deflection which is effective perpendicularly relative to the other crystals of that system. A second crystal system comprising identical crystals is added to the first system. All crystals in the second system which deflect light in one direction are rotated in such a manner by 90° about the system axis that their direction of light deflection corresponds with that of those crystals the light deflection of which extends perpendicularly in the first system. The perpendicularly light deflecting crystals of the second system are rotated relative thereto by 90° about the system axis but in the opposite direction. Between both systems there is arranged an element for rotating the polarization plane of the partial ray beams by 90°. The rotation of the polarization plane of the partial ray beams by 90° can be accomplished in a simple manner by means of $\lambda/2$ - wafers which are known as such.

In the above described further embodiment according to the invention the second system comprises double refractive crystals which are identical in all parameters to the corresponding crystal of the first system. The term "parameter" means for each double refractive crystal the structural values which are characteristic for its basic shape, for example, the radii of curvature of lenses or the thickness of plane parallel plates, the ordinary and the extraordinary index of refraction as well as the angle between the optical axis and the axis of the system.

Another embodiment according to the invention differs from the just described device in that the crystals of the second system are replaced by crystals which have deviating or different parameters relative to the respective parameters of the corresponding crystals in the first system. Only the aperture aberration is the same for all crystals in both systems. However, the crystals may be made of any desirable material. The other features of the invention remain the same. In connection with this embodiment of the invention it is possible, with the exception of one parameter, to select freely all other parameters of the crystals of the second system. The freely selectable parameters may, for example be determined in such a manner that in addition to the reduction of the aperture aberration further corrections are accomplished. Said remaining one parameter must then be determined in such a manner that each crystal of the second system has the same aperture aberration as the corresponding crystal of the first system.

In this embodiment according to the invention, it is preferable to use in the second system of the device crystals that cause a light deflection which is equal to the light deflection of the corresponding crystal in the first system because in this manner the total light deflection of the device is increased. The light deflection of equal value may be achieved for the crystals of the second system by suitably determining freely selectable parameters.

An especially advantageous embodiment of the invention is seen in forming the crystals of both systems as plane parallel plates because this is a geometrically simple structure and moreover, such plane parallel plates may be employed in devices for the parallel shifting of the partial ray beams.

In order that the invention may be clearly understood, it will now be described, by way of example, with reference to the accompanying drawings, wherein.

Figure 1:
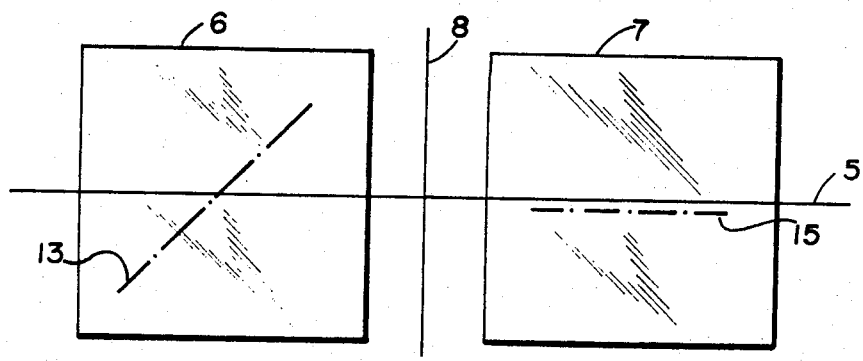
FIG. 1 is a side elevation of an arrangement according to the invention with two completely identical doubly refracting crystals.
Figure 2:
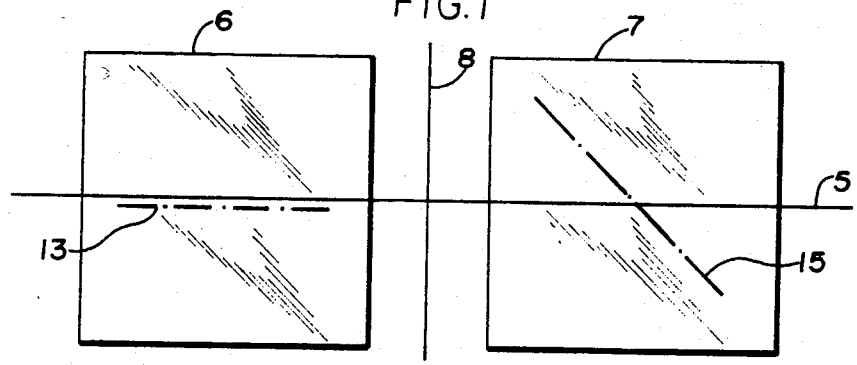
FIG. 2 is a plan view of FIG. 1.

The arrangements shown in FIGS. 1 and 2 consist of a doubly refracting crystal 6 to which there has been added an entirely identical crystal 7 with the exception however, that it is rotated about the system axis by 90°. Between the two crystals 6 and 7 there is arranged a λ/2 thin plate or lamina 8 for the rotation by 90° of the polarization plane of the divided ray bundles.

Figure 3:
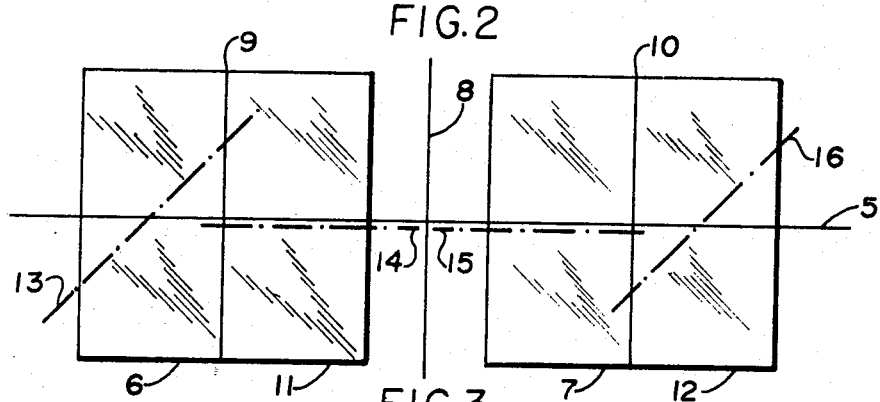
FIG. 3 is a side elevation of an arrangement according to the invention with two identical systems of doubly refracting crystals.
Figure 4:
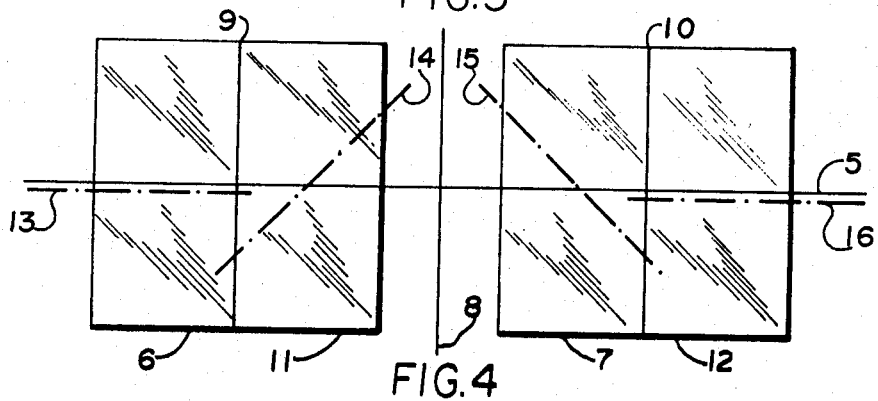
FIG. 4 is a plan view of FIG. 3.

In FIGS. 3 and 4, there is shown an arrangement in which instead of individual crystals 6 and 7 there are used two identical systems 9 and 10 consisting each of doubly refracting crystals 6, 11 or 7, 12. The position of the optical axis 13 in relation to 14 in system 9 and axis 14 in relation to 16 in system 10 coincide, i.e., are the same.

The doubly refracting crystals 11, 12 bring about, in the known manner, a correction of the path length difference between the ordinary and the extraordinary divided ray bundles. These crystals are rotated by 90° about the system axis in relation to the doubly refracting crystals 6, 7 respectively, so that the position of the optical axis 14 and 16 relative to the system axis 5 is not changed. The doubly refracting crystal 6 splits an occurring converging light ray bundle into an ordinary and an extraordinary divided ray bundle. Both of the resultant divided ray bundles are laterally offset in relation to each other. The focus point of their paraxial rays are not in the same plane due to the path length differences existing between the ordinary and the extraordinary divided ray bundles.

The ordinary divided ray bundle thereafter passes through the doubly refracting crystal 11 as an extraordinary divided ray bundle and the extraordinary divided ray bundle pass through the crystal 11 as an ordinary divided ray bundle due to the fact that the crystal 11 is rotated in relation to crystal 6 by 90° about the system axis. The path length difference between the divided ray bundles is equalized in crystal 11, as a result of which the two focus points are now in one plane.

However, because of the aperture defects, the focus points of the paraxial rays for the two divided ray bundles for different incidence planes do not coincide and the image spots which are produced by such system 9 still exhibit a considerable size. The largest deviation occurs between the focus points of the paraxial rays for the incident plane which incident plane coincides with the principal section of the doubly refracting crystal 6 and the focus points for the incident plane which is perpendicular to this principal section.

Since, however, in accordance with the invention, the system 10 is rotated about the system axis 5 and the polarization plane of both divided ray bundles is rotated by 90° by the λ/2 thin plate 8, the incident plane which coincides with the principal section of crystal 6 is disposed perpendicular to the principal section of crystal 7. An incident plane which is perpendicular to the principal section of crystal 6 will coincide with the principal section of crystal 7. Therefore, in both divided ray bundles, the difference in location between the focus points of the paraxial rays for the observed incident plane in system 10 has the opposite sign to that of system 9. The resulting difference in position is, therefore, zero and the extent of the image spots of each of the two divided ray bundles is considerably reduced after the two divided ray bundles have passes through the λ/2 - thin plate 8 and the system 10.

The correction of the path length difference between the ordinary and the extraordinary divided ray bundles is achieved in system 10 by crystal 12 in the same way as has been described for system 9.

Because of the considerable reduction in the extent of the image spots of each of the two divided ray bundles, the distance of the two image spots, i.e., the magnitude or size of the light deviation can be reduced. As this distance is in proportion to the thickness of crystals 6, 11, 7, 12, this thickness can, therefore, also be reduced. Through this reduction there can be achieved a further reduction of the extent of the two image spots as the extent of the image spots is also in proportion to the thickness of crystals 6, 11, 7, 12.

The embodiment according to FIGS. 3 and 4 causes in comparison with a known uncorrected system having the same crystal thickness a $\sqrt{2}$ fold light deviation as in systems 9 and 10 the light deviations are perpendicular to each other. If this increase in the light deviation is not desirable, then the increase can be avoided by reduction of the thickness of the doubly refracting crystals 6, 11, 7, 12 by $\sqrt{2}$.

Figure 5:
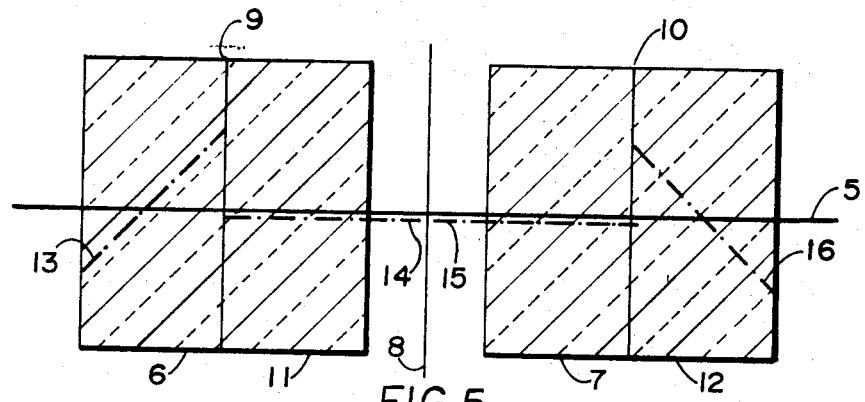
FIG. 5 illustrates a side view of the device according to the invention comprising systems of double refractive crystals for reducing the aperture aberration.
Figure 6:
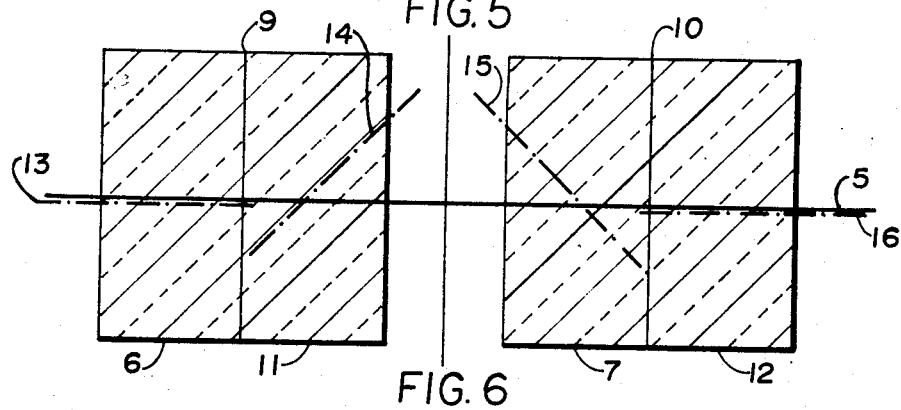
FIG. 6 is a top view of FIG. 5.

The device illustrated in FIGS. 5 and 6 represents another embodiment of the invention. In this embodiment the optical axis of crystal 7 is rotated by +90° relative to the optical axis of crystal 6 whereas the optical axis of crystal 12 is rotated by −90° relative to the optical axis of crystal 11 and about the system axis 5. The arrangement of the crystals is such that the angle of each of the optical axes 13, 14, 15 and 16 relative to the system axis 5 is the same.

A means 8 for rotating the polarization plane of the partial ray beams by 90° is arranged between the first system 9 and the second system 10. Such polarization plane rotating means 8 may be provided in the form of a λ/2 - wafer.

The double refractive crystals 11 and 12 cause in a manner known as such a correction of the spacing difference between the ordinary and the extraordinary partial ray beam. The axes of these crystals 11 and 12 are rotated relative to the double refracted crystals 6 and 7 by +90° or −90° respectively. In each instance the rotation is about the system axis 5. As a result of the rotation of the double refractive crystal 11 its light deflection is effective perpendicularly to the direction of light deflection of the crystal 6.

The double refractive crystal 6 splits an incident, convergent beam of light rays into an ordinary partial ray beam and into an extraordinary ray beam. The partial ray beams are laterally displaced relative to each other. Due to the spacing difference between the ordinary and the extraordinary partial ray beam the focusing points of their paraxial rays do not fall into the same plane.

The partial ray beam which initially is the so called ordinary partial ray beam now passes through the double refractive crystal 11 as the so called extraordinary partial ray beam whereas the partial ray beam which is initially the extraordinary partial ray beam passes the crystal 11 as the ordinary partial ray beam. This is so, because the crystal 11 is rotated about the system axis 5 by 90° relative to the crystal 6. As a result, the spacing difference between the two partial ray beams is compensated in the crystal 11 whereby the two focusing points now fall into one and the same plane.

Due to the aperture aberration, however, the focusing points of the paraxial rays for both of the partial ray beams of different planes of incidence do not coincide. Therefore, the image specks of the picture achieved by means of the system 9 still have a substantial spread. The largest deviation occurs between the focusing point of the paraxial rays for the plane of incidence which coincides with the main section of the double refractive crystal 6 and the focusing point for the plane of incidence which extends perpendicularly relative to said main section.

However, due to the fact that according to the invention the crystal 7 is rotated by +90° and the crystal 12 is rotated by −90° about the system axis 5 and since the polarization plane of both partial ray beams are rotated by 90° through the λ/2 - wafer 8 a plane of incidence which coincides with the main section of the crystal 6 extends perpendicularly to the main section of the crystal 7. A plane of incidence which extends perpendicularly to the main section of the crystal 6 coincides accordingly with the main section of the crystal 7. As a result, the spacing difference between the focusing points of the paraxial rays of the planes of incidence under consideration in the system 10 has the opposite sense as that in system 9 for both partial ray beams. The resulting spacing difference thus becomes zero and the spread or extension of the image speck of each of the two partial ray beams is substantially reduced after the two partial ray beams have passed the λ/2 - wafer 8 and the system 10.

The correction of the spacing difference between the ordinary and the extraordinary partial ray beam is accomplished in the system 10 by means of the crystal 12 in the same manner as has been described above with reference to the system 9.

In the embodiment according to the invention thus far described the light deflections of the crystals 6 and 12 are added to each other as well as the light deflections of the crystals 11 and 7. If the size or the extent of the light deflection of the crystal 6 corresponds to that of the crystal 11 and thus also the light deflection of the crystal 7 to that of the crystal 12 then the resulting light deflections of the systems 9 and 10 will be effective in one and the same direction and accordingly these light deflections will be added to each other. As a result, the total light deflection of the device becomes twice as large as the resulting light deflection of the system 9 or the resulting light deflection of the system 10.

Where a doubling of the light deflection is undesirable it is possible to avoid it by reducing the thickness of all the double refractive crystals 6, 7, 11 and 12 to half the thickness which they would normally have in an uncorrected system.

In the device described with reference to the above embodiment the crystals in both systems are completely identical to each other.

According to a further embodiment of the invention, for which FIGS. 5 and 6 are also applicable, the crystals which correspond to each other respectively, that is crystals 6, 7 and 11, 12, are made of different material and they accordingly distinguish each other by their different indices of refraction. However, all double refractive crystals 6, 11, 7 and 12 are formed as plane parallel plates. The angle of the optical axis 15 and 16 of the crystals 7 and 12 relative to the system axis 5 has been selected so that the crystals which correspond to each other, namely 6, 7 and 11, 12, effect a light deflection of equal size. Stated differently, each crystal effects the same light deflection because in this manner the total light deflection of the device is increased. The thickness of the crystals 7 and 12 is determined so that the crystal 7 has the same aperture aberration as the crystal 6 and so that the crystal 12 has the same aperture aberration as the crystal 11. The function and the remaining structural features of this embodiment correspond to the respective statements made above with regard to the first embodiment as described.

Figure 7:
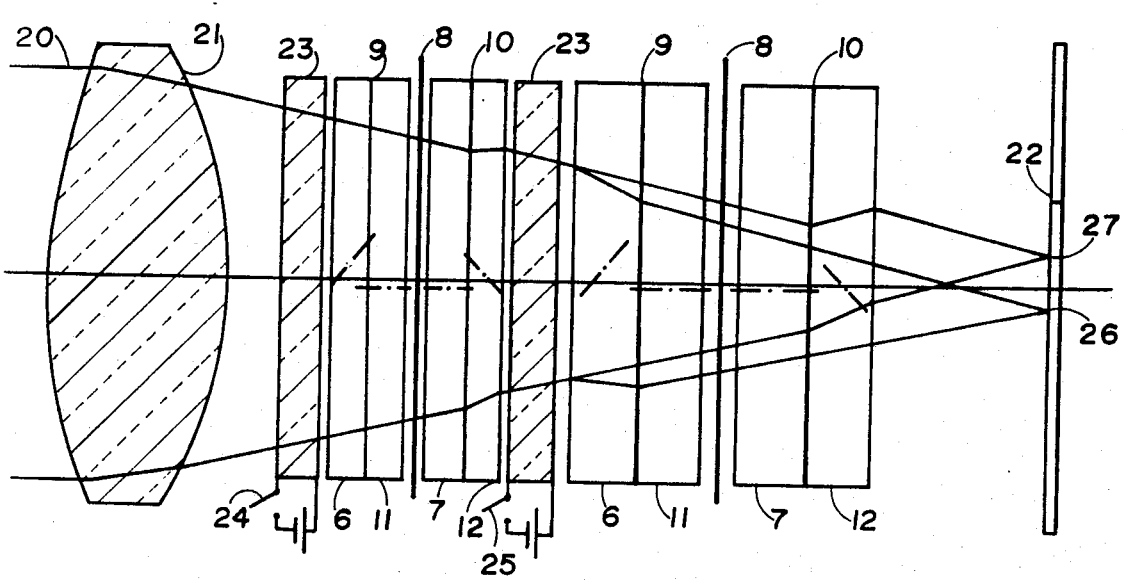
FIG. 7 illustrates a light deflecting system comprising two stages.

FIG. 7 illustrates a light deflecting device comprising two stages. An essential element or feature of the light deflecting device according to FIG. 7 is the system comprising double refractive crystal means as described with reference to FIGS. 5 and 6. The beam of parallel rays 20 of a laser (not shown) is focused by means of the objective 21 onto a storage layer 22. The indices of refraction of the double refractive crystals 6, 11, 7 and 12 are dependent on the direction of polarization of the beam of rays. This dependency is employed for the deflection of polarization of each convergent partial ray beam by 90°. The electro-optical crystals 23 are connected to a respective voltage source through switch means 24 and 25. The two orthogonal states are obtained by applying a zero voltage or a voltage $V_{\lambda/2}$. If both switch means 24 and 25 are opened then the focusing point of the example or selected partial ray beam is located at point 26 as seen in FIG. 7. However, if the switch 24 is opened and the switch 25 is closed, the ray beam will be focused at point 27 at shown. In this manner, it is possible to obtain four different focusing points by means of the light deflection system illustrated in FIG. 7.

The difference illustrated above between the focusing points 26 and 27 may also be accomplished if the systems 10 of each stage and the λ/2 - wafer 8 are omitted and if the length of the crystals 6 and 11 is increased by a factor of $\sqrt{2}$. In this instance the image speck caused by the aperture aberration is increased substantially. Thus, if the individual image specks are not supposed to overlap each other, it is necessary to correct the aperture aberration as described with reference to FIGS. 5 and 6. It is to be noted that the crystal systems of FIGS. 1-4 may also be employed in the arrangement of FIG. 7.

The device according to the invention has different optical characteristics as compared to an uncorrected individual system. For example, a change in the spacing or in the angle of the partial ray beams relative to each other is present in the device according to the invention. If such a change is not desirable, it is easy to restore the original characteristics of the uncorrected individual system simply by correcting the respective geometric dimensions of the double refractive crystals. For example, if the double refractive crystals of the device according to the invention are shaped or formed as plane parallel plates, enlarged light deflection results as compared to an uncorrected individual system. Thus, the total light deflection of the device is doubled if the sum of the light deflections of all crystals in one direction is equal to the sum of the light deflections of all crystals which deflect in a direction perpendicularly to said one direction in the first system and if the crystals which correspond to each other in both systems cause the same light deflection. However, this is easily corrected by reducing the thickness of the crystals, as mentioned, to one half the thickness the respective crystals would have in an uncorrected system. Thus, the same light deflection is achieved as would be achieved with a comparable uncorrected system. This applies independently of the fact whether or not the crystals which correspond to each other in both systems have the same or different parameters provided that they cause the same light deflection or rather light deflections having the same size.

The reduction of the aperture aberration is accomplished by the apparatus according to the invention in the same manner as described above with reference to the known device because the position of the focusing points of the paraxial rays is invarient relative to rotations of the plane of incidence by 180°.

It is an advantage of the device according to the invention that it prevents the partial compensation of light deflections of individual crystals of the first system by respective light deflections of the second system. In this manner the total light deflection of the device becomes larger than $\sqrt{2}$ times the light deflection of a single individual system. If the sum of the light deflections of all crystals which in the first system of the device deflect in the same direction is equal to the sum of the light deflections of all crystals which deflect perpendicularly thereto, then the total light deflection of the device becomes twice as large as the light deflection of a single system. This means that for a predetermined total light deflection the total length of the device as well as the required material for the crystals of the device have been reduced. This is a substantial advantage of the present invention.

Although specific embodiments have been described, it is intended to cover all modifications and equivalents within the scope of the appended claims.

What is claimed is:

1. An arrangement of doubly refracting crystals for the reduction of aperture defects comprising first doubly refracting crystal means comprising a first doubly refracting crystal, said crystal having its optic axis at an oblique angle with respect to the system axis, a second doubly refracting crystal means comprising a second doubly refracting crystal substantially identical with said first doubly refracting crystal, and an element for rotating the polarization plane of divided ray bundles, said element being positioned between said first and second means, said second crystal being rotated by 90° about the system axis with respect to said first crystal.

2. The arrangement of claim 1 in which said first crystal means further comprises a third doubly refracting crystal and said second crystal means further comprises a fourth doubly refracting crystal, said third and fourth crystals being substantially identical with said first and second crystals respectively and being rotated by 90° with respect to said first and second crystals respectively, whereby the path length difference between the ordinary and extraordinary divided ray bundles is corrected.

3. The arrangement of claim 2 wherein said doubly refracting crystals are planoparallel plates.

4. An aperture aberration reducing system of birefringent crystals including means for correcting path length difference between ordinary and extraordinary partial beams, said aberration reducing system comprising first and second systems each having a plurality of birefringent crystals, and means for rotating a polarization plane of any partial ray beams by 90°, said crystal systems and rotating means having a common axis, said first system including first and second crystals positioned to deflect light of different relatively perpendicular polarizations, said second system including third and fourth crystals geometrically similar to said first and second crystals, said third and fourth crystals being positioned to deflect light of different relatively perpendicular polarizations, said rotating means being positioned between said first and second systems, said third crystal having its optic axis oriented to deflect light of the same polarization as said second crystal but which, due to the rotating means, deflects partial ray beams of light not deflected by said second crystal, whereby the path length difference between ordinary and extraordinary partial ray beams is corrected.

5. The aperture aberration reducing device according to claim 4, wherein said double refracting crystal means of the first and second crystal system comprise plane parallel disks.

6. The aperture aberration reducing device according to claim 5, wherein said plane parallel disks have a thickness corresponding to 1 $\sqrt{2}$ of the thickness of respective crystals in a device without correction of the aperture aberration.

7. The aperture aberration reducing device according to claim 4, wherein said double refracting crystal means forming the second crystal system have parameters which differ from the parameters of respective crystal means forming said first crystal system, except for the aperture aberration so that the crystal means of the first and second crystal system have the same aperture aberration.

8. The aperture aberration reducing device according to claim 7, wherein the crystal means of the second crystal system have a light deflection which is equal to the light deflection of the respective crystal means of the first crystal system.

9. The aperture aberration reducing device according to claim 7, wherein said crystal means of the first and second crystal systems comprise plane parallel disks.

10. An aperture aberration reducing device, comprising a first crystal system comprised of a plurality of double refracting crystal means, a second crystal system comprised of a corresponding plurality of double refracting crystal means, said crystal system having a common axis, said crystal means of the first crystal system including at least one crystal oriented to deflect light of a polarization which is perpendicular relative to the polarization of light deflected by another crystal means of said first system, said crystal means of the second system comprisng at least one crystal which is rotated by 90° in a given rotation direction relative to said common axis whereby said rotated crystal of the second system in the absence of intervening ray rotating means deflects light of the same polarization as said other crystal means of the first system, said crystal means of the second system further comprising another crystal means oriented to deflect light of a polarization perpendicular with respect to the light deflected by said one crystal means of the second system, said another crystal means of said second system being rotated by 90° relative to said common axis with respect to said one crystal of said second system but in a direction opposite to said given rotational direction, and means between said systems for rotating a polarization plane of any partial ray beams by 90°, whereby the distance between ordinary and extraordinary partial ray beams is corrected.

11. The aperture aberration reducing device according to claim 10, wherein said polarization plane rotating means for rotating said partial ray beams by 90° is a wafer having a thickness equal to $\lambda/2$.

12. The aperture aberration reducing device according to claim 10, wherein said double refracting crystal means of the first and second crystal system comprise plane parallel disks.

13. The device of claim 2 in which said third and fourth crystals are rotated in the same direction relative to said first and second crystals respectively.

14. The device of claim 2 in which said third and fourth crystals are rotated in opposite directions relative to said first and second crystals respectively.

15. The aperture aberration reducing device according to claim 4, wherein said polarization plane rotating means for rotating said partial ray beams by 90° is a wafer having a thickness equal to $\lambda/2$.

* * * * *